United States Patent [19]
Bailey et al.

[11] Patent Number: 4,983,436
[45] Date of Patent: Jan. 8, 1991

[54] RETROREFLECTIVE SHEETING WITH BACKING FILM

[75] Inventors: Terry R. Bailey; Howard R. Tolliver, both of Woodbury; Douglas C. Degler, White Bear Lake; Dennis J. Chirhart, West St. Paul, all of Minn.

[73] Assignee: Minnesota Mining and Manufacturing Company, St. Paul, Minn.

[21] Appl. No.: 38,639

[22] Filed: Apr. 15, 1987

[51] Int. Cl.⁵ .................. B32B 15/08; G02B 5/128
[52] U.S. Cl. ........................ 428/40; 428/161; 428/325; 428/412; 428/461; 428/476.1; 428/483; 428/913; 428/336; 350/105
[58] Field of Search ............. 428/40, 325, 461, 483, 428/476.1, 441, 412, 161, 164, 336, 913; 350/105

[56] References Cited

U.S. PATENT DOCUMENTS

| 2,407,680 | 9/1946 | Palmquist et al. | 350/105 |
| 3,065,559 | 10/1958 | McKenzie | 350/105 |
| 3,176,584 | 4/1965 | DeVries et al. | 350/105 |
| 3,188,266 | 6/1965 | Charbonneau et al. | 428/345 |
| 3,795,435 | 3/1974 | Schwab | 350/105 |
| 3,877,786 | 4/1975 | Booras et al. | 350/105 |
| 3,936,567 | 2/1976 | Vesely | 428/325 |
| 4,230,753 | 10/1980 | Sheyon | 428/40 |
| 4,418,110 | 11/1983 | May et al. | 428/143 |
| 4,505,967 | 3/1985 | Bailey | 428/325 |
| 4,511,210 | 4/1985 | Tung et al. | 350/105 |
| 4,663,213 | 5/1987 | Bailey et al. | 428/204 |
| 4,664,966 | 5/1987 | Bailey et al. | 428/325 |
| 4,678,695 | 7/1987 | Tung et al. | 428/325 |
| 4,721,649 | 1/1988 | Belisle et al. | 428/325 |
| 4,725,494 | 2/1988 | Belisle et al. | 428/325 |
| 4,767,659 | 8/1988 | Bailey et al. | 428/325 |

FOREIGN PATENT DOCUMENTS 2409479 6/1973 Fed. Rep. of Germany ...... 428/325

Primary Examiner—George F. Lesmes
Assistant Examiner—Christopher Brown
Attorney, Agent, or Firm—Donald M. Sell; Walter N. Kirn; Robert H. Jordan

[57] ABSTRACT

A retroreflective sheeting having incorporated therein an optically-nonfunctional backing film. The backing film comprises at least a self-adherent layer which is adhered directly to the rear side of the specularly reflecting layer of the sheeting and, may further comprise one or more layers, such as a reinforcing layer, on the rear side of the self-adherent layer. The physical properties of the backing film, e.g., tensile strength, tear resistance, elongation, or adhesive compatibility are selected according to the properties desired of the resultant retroreflective sheeting. The self-adherent layer may comprise: polyethylene; or one or more copolymers comprising by weight a major portion of at least one of ethylene or propylene, and a minor portion of a polar comonomer; or a blend comprising (a) one or more other polymers and (b) one or more of such copolymers or polyethylene or combinations of such copolymers and polyethylene, the blend comprising a major portion by weight of ethylene and/or propylene.

33 Claims, 2 Drawing Sheets

RETROREFLECTIVE SHEETING WITH BACKING FILM

FIELD OF INVENTION

This invention concerns retroreflective sheetings, and specifically concerns sheetings that incorporate a backing film, i.e., a film that strengthens or otherwise modifies the physical properties of the sheetings.

BACKGROUND

Microlens-based retroreflective sheetings are well-known in the art. One form of such sheeting is embedded-lens sheeting wherein transparent microspheres, arranged in substantially a monolayer, are at least partially embedded in a transparent binder or spacing layer with a specularly reflecting layer behind the microspheres underlying the spacing layer. Examples of embedded-lens sheetings are disclosed in U.S. Pat. No. 2,407,680 (Palmquist et al.) and in U.S. Pat. No. 4,511,210 (Tung et al.). Typically one or more transparent cover layers are disposed in front of the microspheres. If the microspheres are only partially embedded in the binder layer, the front of the microspheres are embedded in the cover layer. Such cover layers complete the optical relationships needed for retroreflection and may further serve to provide a protective front surface to the sheeting, such as is provided by a tough, weather-resistant, scratch-resistant polymeric cover film. Alternatively, instead of a cover film, a layer of substantially transparent adhesive may be provided in front of the microspheres, such adhesive being used, for example, to secure the sheeting to the inside of an automobile window such that the sheeting is viewed from outside the automobile.

An advantage of embedded-lens sheetings is that, because the microspheres are embedded within the sheeting, incident light rays are focused onto the specularly reflecting layer irrespective of whether the front of the sheeting is wet or dry. Thus, such sheetings are used in many applications, for instance, providing improved visibility to traffic signs, automobile license plates, etc. Such sheetings are often sold having an adhesive layer covered by a removable protective liner on the rear side of the specularly reflective layer. In use the liner is removed and the sheeting adhered to a desired substrate with the adhesive.

In order to achieve high brightness or efficient retroreflection, it is sometimes preferred to construct retroreflective sheeting with a very high density of microspheres. It is also often necessary to use dimensionally stable and what are typically very brittle and very hard materials in the spacing layer so that the dimensional relationships between the microspheres, spacing layer, and specularly reflecting layer remain constant during the conditions encountered in fabrication of a finished product with the sheeting, e.g., a license plate, and over an extended period of time despite outdoor exposure. Also, such forms of retroreflective sheeting may be thin and thereby flimsy. For all these reasons, the sheetings typically require extraordinary care in handling, and may not emboss well, suffering cracks along the outline of embossing, e.g., alphanumeric characters or other indicia. Such cracks are aesthetically undesirable and weaken the sheeting thereby rendering it more susceptible to environmental degradation.

U.S. Pat. No. 3,176,584 (DeVries et al.) discloses that a reinforcing layer may be incorporated into sheetings as taught in that patent. The reinforcing layer may be of similar composition as the binder or space coat material in which the microspheres are embedded and may be applied to the back side of the specularly reflecting layer via spraying, i.e., by a solvent-coating technique. Examples disclosed therein include methyl methacrylate, flexible epoxy resins, chloro-sulfonated polyethylene, polystyrene, polypropylene, polycarbonate resin, ethyl cellulose, and cellulose acetate-butyrate. The reference does not discuss the advantages or usefulness of such a layer, except to point out that when applied to the contoured reflecting layer, the reinforcing layer provides a flat surface. The specularly reflecting layers of retroreflective sheetings are typically very thin, i.e., on the order of 0.06 micron thick, and must be disposed in special relationship to the microspheres in order for the sheeting to provide useful retroreflection. Because the specularly reflecting layers are typically so thin, they are themselves very fragile and do not provide substantial protection to the spacing layer. Thus the sheeting may be subject to impairment of retroreflective response caused by disturbance of the specularly reflective layer and spacing layer as the reinforcing layer is applied. Such disturbance may be particularly critical where the reinforcing layer is applied with high solvent content or at high temperature that may cause the spacing layer to deform.

U.S. Pat. No. 3,936,567 (Vesely) discloses an embedded-lens retroreflective sheeting wherein a member, described therein as an inner supporting layer, is adhered to the rear side of the specularly reflecting layer with an intermediate layer of adhesive. The inner support layers are taught by the reference to comprise a layer of plastic film such as polyvinyl chloride film, polyethylene terephthalate film, polyethylene film, nylon film, polypropylene film and similar such materials, and to generally be on the order of 5 to 15 mils thick. Adhesion of the supporting layer to the specularly reflecting layer with an intermediate layer of adhesive, as taught by the reference, gives rise to such disadvantages as increased costs for the adhesive and its application and imparts increased bulk to the sheeting, rendering it thicker and therefore more difficult to roll.

U.S. Pat. No. 3,877,786 (Booras et al.) discloses a retroreflective sheeting with a backing or reinforcing member which is intended to support and stiffen the entire article. Examples of backing materials disclosed therein include corrugated paper board, a plastic laminate reinforced with glass fibers, and metal plate. Increased stiffness of the reflective film is apparently desired to enable easier registration of the sheeting for application of one or more colored overcoats to the reflective surface thereof. Such increased stiffness, however, may be undesirable in many applications, e.g., wherein the retroreflective sheeting is to be embossed or adhered to substrate which is not flat, such as a traffic cone. Further, although the reference does not expressly so disclose, the reinforcing members disclosed therein would presumably have to be adhered to the specularly reflecting layer with an intermediate layer of adhesive.

SUMMARY OF INVENTION

The present invention provides retroreflective sheetings which may have high flexibility, improved embossability, high impact resistance, high tear resistance, and increased tensile strength. The sheetings provided herein may have high adhesive compatibility, enabling a wide variety of special purpose applications, e.g., removable embodiments, and in some embodiments may be thermally self-adhered to substrates such as metals without use of an additional pressure-sensitive adhesive, thereby eliminating the cost of same and of a release liner. Additionally, such sheetings may possess sufficient body and stability such that they do not require extraordinary care when being handled, and may typically be printed on in roll or sheet form, e.g., flexographic printing, offset printing or screen printing, and may also be accurately and cleanly cut, e.g., by die cutting, into desired patterns.

In brief summary, the novel retroreflective sheeting of the invention is a microsphere-based retroreflective sheeting comprising: (1) transparent microspheres, typically arranged in substantially a monolayer; (2) a transparent binder or spacing layer which the microspheres are supported by and at least partially embedded in; (3) a specularly reflecting layer underlying the spacing layer behind the microspheres; and (4) a backing film. The transparent microspheres are typically glass. The spacing layer may be a substantially thermoset material that tends to maintain its conformed contour such that the specularly reflecting layer and microspheres remain disposed in the desired relationship for retroreflection. Typically the sheeting further comprises one or more transparent cover layers disposed in front of the microspheres in which the microspheres may be partially embedded. Such cover layers complete the optical relationships needed for retroreflection and may further serve to provide protection to the sheeting. Examples of suitable cover layers include polymeric, typically weather-and/or scratch-resistant, cover films; or a layer of substantially transparent adhesive, by which the sheeting may be adhered, for example, to a window as a window sticker that is visible from the opposite side of the window. According to the invention, the backing film is self-adhered directly to the rear side of the specularly reflecting layer. Thus, the advantages of this invention are achieved without interference with the optical properties or relationships of the retroreflective sheeting, i.e., the backing film is optically nonfunctional. The backing film may be preformed, i.e., it is formed before being adhered to the specularly, reflecting layer, or may be formed directly thereon by extrusion.

The backing film comprises at least one layer referred to herein as the self-adherent layer. The self-adherent layer, which is adhered directly (i.e., without an additional adhesive agent) to the specularly reflecting layer, comprises a polymer that is substantially thermoplastic and nonelastomeric, is preferably extruded, and comprises: polyethylene; or preferably, one or more copolymers of monomers comprising by weight a major proportion of at least one of ethylene or propylene, and a minor proportion of at least one polar comonomer; or a blend comprising (a) one or more other polymers and (b) one or more of such copolymers or polyethylene or combinations of such copolymers and polyethylene, the blend comprising a major portion by weight of ethylene and/or propylene. By "nonelastomeric", it is meant that the self-adherent layer does not have a substantial tendency to recover or return to its initial dimensions when stretched at room temperature and the stretching force is released. The self-adherent layer typically has a melt index of less than 500, while those polymers having a melt index of less than 150 are typically preferred, and those having a melt index of less than 20 are most preferred. Polymers having lower melt indices are typically easier to extrude and more resistant to softening at elevated temperatures.

If desired, the backing film may further comprise at least one additional layer, for example, a reinforcing layer, disposed on the rear side of the self-adherent layer, i.e., the side opposite that which is adhered to the specularly reflecting layer. Examples of materials which may be used in such a reinforcing layer include nylon and polyester which may be used to provide the sheeting with exceptional tear resistance and tensile strength.

Retroreflective sheetings of the invention are typically more conveniently handled than similar sheetings in which no backing film is incorporated. The increased tensile strength and greater tear resistance which may be provided herein substantially eliminate the need for extraordinary care when handling such sheeting. Further, the backing film imparts more body to the sheeting, which, however, may still be rolled, thereby rendering same more convenient to work with. Sheeting of the invention typically possesses sufficient body that it may be printed upon, in either roll or sheet form, e.g., by flexographic printing, screen printing, or offset printing, and may be accurately and cleanly cut, e.g., by die cutting, into desired shapes, such as alphanumeric characters.

Utilization of a backing film according to the invention may increase the impact resistance, particularly at low temperatures, and improve the embossability of retroreflective sheeting in which it is incorporated. Further, in some embodiments retroreflective sheetings of the invention may be heat laminated directly to a substrate such as a metal surface without another adhesive agent to produce, e.g., license plates or traffic signs. In such embodiments, the backing film acts as adhering means to provide a self-adhering bond to the substrate, thereby eliminating the need for, and cost of, an adhesive and release liner. Alternatively, the backing film may provide an adhesive-compatible surface, thereby enabling, for instance, use of adhesives which may not provide sufficient bonding strength to the specularly reflecting layer.

Accordingly, the backing films provided herein differ from those of the prior art in that they provide effective self-adhesion to materials, commonly used in the specularly reflecting layer, thereby eliminating the need for an intermediate adhesive layer and the costs for such adhesive and its application, while also providing desired physical properties such as the tensile strength, high tear resistance, high impact resistance, and cold temperature (i.e., $-40°$ C.) retention of properties.

DESCRIPTION OF THE DRAWING

The invention will be further explained in the drawing, wherein.

Figure 1:
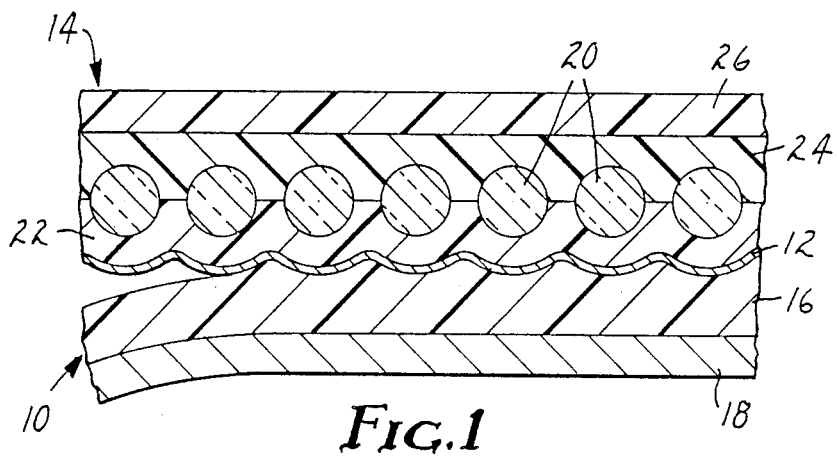
FIG. 1 is a cross-sectional representation of a portion of an embedded-lens retroreflective sheeting of the present invention illustrating lamination of a backing film directly to the rear side of the specularly reflecting layer.

These figures, which are not to scale, are intended to be merely illustrative and nonlimiting.

DETAILED DESCRIPTION OF INVENTION

The advantageous results of this invention have been achieved by incorporation in a retroreflective sheeting, directly to the rear side of the specularly reflecting layer thereof, of a backing film that comprises at least a self-adherent layer and, in some embodiments, that further comprises one or more additional layers, e.g., a reinforcing layer, on the rear side of the self-adherent layer, i.e., the opposite side of the self-adherent layer to that which is directly adhered to the specularly reflecting layer.

The self-adherent layer comprises a polymer that is substantially thermoplastic and nonelastomeric, is preferably extruded, and comprises: polyethylene; or preferably, one or more copolymers of monomers comprising by weight a major portion of at least one of ethylene or propylene, and a minor portion of at least one polar comonomer. The comonomer is preferably polar in nature, e.g., contains an 0, or a N, or combination thereof, to improve adhesion of the resulting copolymer to the specularly reflecting layer, which is typically a metal such as aluminum. Examples include acrylic acid, methacrylic acid, ethyl acrylate, and vinyl acetate. Alternatively, the self-adherent layer may comprise a blend comprising (a) one or more other polymers and (b) one or more of the copolymers described above or polyethylene or combinations of such copolymers and polyethylene, with the major portion of the blend being ethylene and/or propylene. The self-adherent layer typically has a melt index of less than 500, preferably less than 150, and most preferably less than 20. Polymers having lower melt indices are typically easier to extrude and more resistant to softening at elevated temperatures.

A number of suitable polymers are commercially available at reasonable cost, including:

| Supplier | Designation | Comonomer (Weight %) | Helt Index |
|---|---|---|---|
| Dow Chemical Company | PRIMACOR 3440 | Acrylic Acid (9) | 10 |
| E.I. duPont | NUCREL 035 | Methacrylic Acid (20*) | 35 |
| | ELVAX 230 | Vinyl Acetate (28) | 110 |
| | SURLYN 1706 | Methacrylic Acid (**) | 0.7 |

*Total comonomer (believed to also include a small proportion of vinyl acetate)
**Precise composition is unknown Each of these polymers has excellent flexibility at temperatures as low as −40° C., and retains broad adhesive compatibility, self-adhesion to the specularly reflecting layer, and desired strength and toughness at such temperatures. Thus, backing films made from such polymers may be incorporated in retroreflective sheetings to be used for outdoor applications, e.g., license plates or highway markers.

Preferably the self-adherent layer comprises a copolymer which has been crosslinked by cations such as zinc, sodium, or potassium. Such a crosslinked polymer is sometimes here called an "ionomeric copolymer". Such ionomeric copolymers provide good adhesion to metals such as found in the specularly reflecting layer and are believed to have improved tensile strength. Ionomeric copolymers crosslinked with zinc are more preferred because they are believed to be more weatherable and more impermeable to moisture, and to provide better adhesion to metals than other types of ionomeric copolymers. A preferred commercially available ionomeric polyethylene copolymer is SURLYN Brand 1706 Resin, which is a copolymer of, by weight, a major proportion of ethylene and a minor proportion of methacrylic acid ionically crosslinked with zinc ions. This polymer is particularly preferred for embossable sheetings because of the toughness it imparts thereto.

Blends comprising (a) one or more other polymers and (b) one or more of the copolymers described above or polyethylene or combinations of said copolymers and polyethylene, wherein a major portion by weight of the blend is ethylene and/or propylene, may be used to achieve lower costs and provide a backing film having different physical properties, e.g., greater tensile strength or higher impact resistance. In the case of a blend comprising polyethylene, such other polymer is preferably polar in nature to improve the self-adhesion to the specularly reflecting layer.

The self-adherent layer may further comprise such additives as colorants, e.g., pigments; fillers, e.g., glass fibers as reinforcing agents; or stabilizers, as long as such additives do not undesirably interfere with the self-adhesion of the layer to the specularly reflecting layer.

The advantages of this invention, i.e., a retroreflective sheet having the desired physical properties, may be achieved utilizing backing films formed by many techniques. A backing film of the invention may be preformed, such as by extrusion or solvent casting, and then adhered to the rear side of the specularly reflecting layer, e.g., by heat lamination, or the backing film may be formed directly upon the specularly reflecting layer, thereby eliminating an intermediate processing step. The backing film is preferably preformed and then adhered to the specularly reflecting layer as such techniques are typically less strenuous upon the fragile specularly reflecting layer. If the backing film comprises both a self-adherent layer and a reinforcing layer, it is typically preformed and then heat-laminated to the specularly reflecting layer, although some combinations, e.g., a backing film comprising a self-adherent layer of ethylene/acrylic acid copolymer and a reinforcing layer of polypropylene, can be formed directly on the specularly reflecting layer such as by co-extrusion.

The backing film is preferably extruded rather than cast from solution, thus avoiding the cost of solvent and possible, pollution caused by driving off the solvent. Furthermore, extrusion typically permits faster production rates because the time delay incurred in drying a solvent-cast film is eliminated. Also, if the backing film is to be formed directly upon the specularly reflecting layer, it is preferably extruded rather than solvent-cast to reduce the risk that solvent may leak through the specularly reflecting layer to cause deformation of the spacing layer and thereby impair the retroreflective response of the resultant sheeting.

In some instances, adhesion of the backing film to the specularly reflecting layer may be improved by priming with known surface modification treatments such as corona discharge. Polyethylene backing films typically require such treatment to achieve sufficient adhesion to the specularly reflecting layer and are therefore less preferred than the aforementioned copolymers of ethylene and/or propylene which typically do not require such a prime and tend to be stronger and tougher as well.

As described above, the backing film may further comprise at least one layer in addition to the self-adherent layer. Such layer may be a reinforcing layer comprising, for example, nylon, polypropylene, acrylonitrile/butadiene/styrene, polycarbonate, or glass-filled polymers. Biaxially oriented polyester may be used if treated such as by the method disclosed in U.S. Pat. No. 3,188,266 (Charbonneau et al.) to provide an effective bond between the self-adherent layer and polyester reinforcing layer. Such backing films may be used to provide retroreflective sheetings with desired properties such as exceptional tensile strength and tear resistance, or sheetings which are essentially inextensible. In some embodiments the backing film may comprise two layers in addition to the self-adherent layer. For instance, a backing film comprising, in turn a self-adherent layer, a nylon reinforcing layer on the rear side thereof, and a third layer that has the same properties as the self-adherent layer on the rear side of the reinforcing layer, possesses both the particular strength properties imparted by the nylon reinforcing layer as well as the particular surface properties of the third layer, e.g., self-adhesion to metals.

Reduced thickness of the backing film and overall sheeting are typically preferred because of cost savings provided thereby, because less bulky sheetings may be more easily wound upon themselves into rolled form, and because in most uses, thinner sheetings are easier to work with. The total thickness of backing films of the invention are preferably less than 125 micrometers (5 mils) and more preferably less than 75 micrometers (3 mils).

The optimum tear resistance, tensile strength, etc., of the backing film, and of the ultimate retroreflective sheeting, will be determined in part by the intended use of the final construction. For instance, in some embodiments useful backing films should provide the elongation required to permit the composite retroreflective sheeting to stretch sufficiently to be applied as to a traffic cone or to irregular surfaces. Good stretchability also is required when the novel retroreflective sheeting is to be embossed, e.g, on a license plate. To permit embossing under typical conditions in a male/female die to the depth of 2.5 millimeters with minimal, preferably no, cracking, the elongation of the retroreflective sheeting, including the backing film which is part thereof, should be at least 15 percent, is preferably at least 50 percent, and is more preferably at least 200 percent. Conversely, the tensile strength of the sheeting should not be so high that the sheeting, adhered to a surface before embossing, tends to recover so as to delaminate from the precise contours of the embossed characters, i.e., undergo "tenting". Therefore, if the sheeting is adhered to the surface with a typical pressure-sensitive adhesive, the retroreflective sheeting should have a sufficiently low tensile relaxation force, i.e., a tensile relaxation force after 5 minutes relaxation from 50 percent elongation of less than 2300 newtons/meter-width, preferably less than 1000 newtons/meter-width, and more preferably less than 700 newtons/meter-width, such that the sheeting will remain in the embossed contour after embossing. Such sheetings are considered herein to be nonelastomeric. Backing films of the present invention may be applied to retroreflective sheeting so as to enable them to be embossed to greater depths than similar sheetings without such backing films. In some instances, retroreflective sheetings such as those having a high density of microspheres or brittle spacing layers which could not previously be embossed without cracking can be satisfactorily embossed when a backing film is applied thereto according to the present invention.

If the retroreflective sheeting is to be used as a removable construction, i.e., a sheeting that is to be applied to substrate for only a temporary time and then removed, such as to the side of a vehicle, the backing film should impart great tensile strength and tear resistance thereto so as to exceed the strength of the adhesive bond between the sheeting and substrate, to permit convenient removal of the sheeting without tearing and shredding of the same. However, the overall sheeting preferably exhibits an elongation of at least 50 percent and remains flexible, particularly if it is to be applied to compound surfaces such as the sides of a trailer made from corrugated materials and rivets. The excellent adhesive compatibility provided by such a backing film enables use of a wide variety of adhesives which releasably adhere to metals and some paints, such as the sides of the vehicles, by providing the retroreflective sheeting with a receptive surface to which the adhesive will firmly bond.

FIG. 1 shows a backing film 10 being laminated directly to the specularly reflecting layer 12 of an embedded-lens type retroreflective sheeting 14 as taught herein. Specularly reflecting layer 12 is typically a thin layer, i.e., about 100 nanometers thick, of vapor-coated aluminum, silver, etc. The self-adherent layer 16 of the backing film 10 provides self-adhesion directly to the specularly reflecting layer 12 without aid of an intermediate adhesive agent, e.g., a pressure-sensitive adhesive. It may be desirable to corona treat the front surface of the self-adherent layer 16 or rear surface of the specularly reflecting layer 12 before lamination to improve adhesion therebetween. The backing film 10 further comprises a reinforcing layer 18, such as nylon. The retroreflective sheeting shown also comprises a monolayer of microspheres 20 partially embedded in a transparent spacing layer 22 and a dual-layer cover film comprising layers 24, 26.

Figure 2:
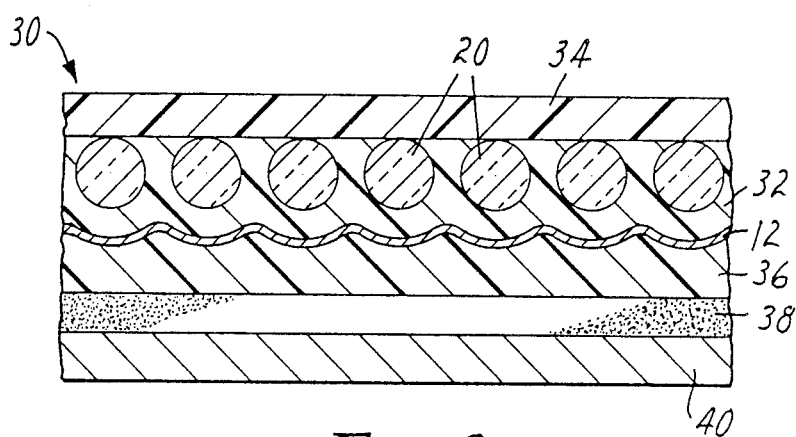
FIG. 2 is a cross-sectional representation of a portion of an embodiment of the invention wherein a layer of adhesive and a removable liner have been applied to the rear side of the backing film.

The backing films disclosed herein may typically be used to provide an adhesive-compatible surface which may be coated with any of a wide variety of adhesives, e.g., heat-activated adhesive, pressure-sensitive adhesive, solvent-activated adhesive, etc. This is of particular advantage if the particular adhesive is one that will not adhere as desired to the specularly reflecting layer or is otherwise incompatible therewith. Such an embodiment is shown in FIG. 2 which illustrates retroreflective sheeting 30 comprising a monolayer of microspheres 20 embedded in a transparent spacing layer 32, transparent cover film 34, and specularly reflecting layer 12. Laminated to the rear surface of the specularly reflecting layer 12 is a backing film of the invention comprising self-adherent layer 36. An adhesive 38 has been applied to the rear surface of self-adherent layer 36 and a protective release liner 40 applied thereover. It may be desirable to corona treat the rear surface of the backing film before application of an adhesive thereto to improve adhesion of the adhesive 38 to the backing film.

Removable embodiments of the invention may be made by coating the back side of the backing film with a removable adhesive, i.e., an adhesive which provides a secure, but releasable bond to the substrate and having an application or bond life of desired length. An advantage of this invention is that retroreflective sheeting can be made which exhibits sufficient tear resistance and tensile strength to exceed the strength of the adhesive bond to the substrate, such that the sheeting may be removed from the substrate cleanly, but which sheeting is also sufficiently flexible and has sufficient elongation that it can be applied to a compound surface. Furthermore, it has been found that, in some instances, an adhesive will preferentially adhere to the backing film as to a substrate, such as aluminum, steel or a painted surface, such that the adhesive will be removed with the retroreflective sheeting upon application of a peel force.

Figure 3:
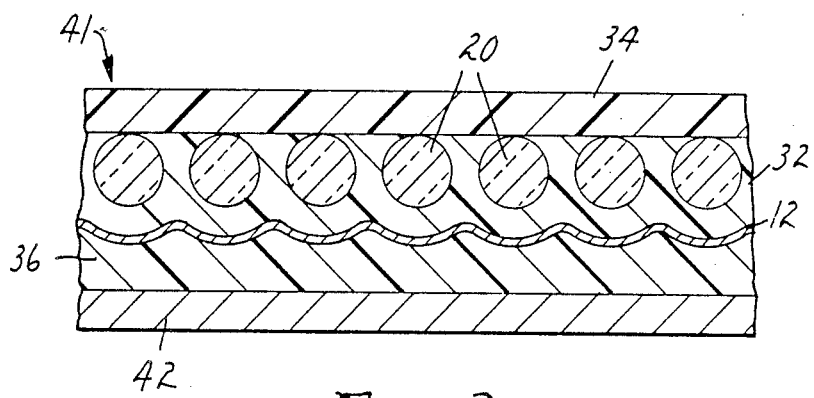
FIG. 3 is a cross-sectional representation of a portion of another embodiment of the invention that has been adhered to a metal substrate utilizing the backing film as adhering means.

A further unexpected advantage of this invention is that retroreflective sheetings incorporating such backing films as disclosed herein may be adhered to many substrates without an additional adhesive agent. FIG. 3 illustrates such an embodiment wherein a retroreflective sheeting 41 has been adhered directly to a metal substrate 42 with a backing film comprising self-adherent layer 36. Retroreflective sheeting 41 may be hot laminated directly to substrate 42 which may be, for example, an aluminum license plate or sign blank, thereby eliminating the need for an adhesive layer and application/removal of a release liner which is typically discarded after only one use. Backing films comprising ethylene/acrylic acid copolymers have provided bonds to aluminum surfaces having peel strength values of as high as 5000 newtons/meter-width. Thus, if embossed, such sheetings are typically more resistant to tenting.

Figure 4:
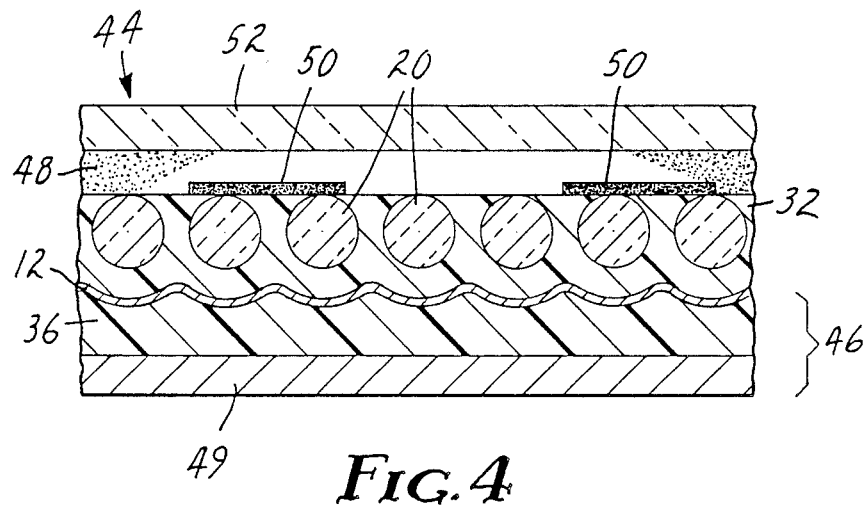
FIG. 4 is a cross-sectional representation of a portion of an embodiment of the invention adhered to the inside of a windshield as a sticker visible from the outside thereof, with a layer of transparent adhesive disposed in front of the microspheres.

FIG. 4 illustrates an embodiment 44 of the invention employed as a retroreflective window sticker. The window sticker 44 comprises a monolayer of microspheres 20 embedded in a transparent spacing layer 32, a specularly reflecting layer 12, a layer of substantially transparent adhesive 48, and a backing film 46 which comprises a self-adherent layer 36 and a reinforcing layer 49. A legend 50, e.g., a flexographically printed ink image, has been printed on the front surface of the monolayer of microspheres 20 and spacing layer 32 before application of adhesive layer 48. The sticker is adhered to a surface of a window, such as the inside of a windshield 52 of an automobile (not shown), by the adhesive 48 so as to be visible from the other side of the window. In such an embodiment, the backing film 46: (1) provides sufficient tensile strength, tear resistance, and body to the retroreflective sheeting 44 that the same can be handled without extraordinary care, and has sufficient body to be converted, i.e, a legend printed thereon, adhesive and release liner, if any, applied thereto, and cut into desired size; and (2) protects the specularly reflecting layer 12 once the sticker is applied to the windshield 52, e.g., from abrasive action and cleaning agents which may be used to clean the windshield. Examples of transparent substrates to which such a construction may be adhered include glass, polycarbonate, polymethyl methacrylate, and rigid or plastized polyvinyl chloride.

The invention will now be further explained by the following illustrative examples.

TESTING

The following methods were used to evaluate the retroreflective sheetings discussed in the examples.

TENSILE STRENGTH AND ELONGATION

The tensile strength and total elongation of some of the retroreflective sheetings of the examples were tested under ASTM Test Method D882-80a.

EMBOSSABILITY

The retroreflective sheeting was adhered with a pressure-sensitive adhesive or directly self-adhered, as indicated, to a soft aluminum blank typical of an automotive license plate and having a thickness of 0.8 millimeters. The blank was then embossed using a male/female embossing die which produced six figure O's that respectively embossed to a depth of 1.3, 1.5, 1.8,. 2.0, 2.3, and 2.5 millimeters. The zeros were 7.7 centimeters high, 3.1 centimeters across, and had a stroke width of 0.7 centimeters. The slope at the edges of the embossed character varied from 0.35 at 1.3 millimeters depth to 0.7 at 2.5 millimeters depth.

EXAMPLE 1

One hundred parts of SURLYN 1706, an extrusion grade, thermoplastic, HMW ionomeric copolymer believed to consist of a major proportion of ethylene monomer and methacrylic acid monomer crosslinked with a zinc salt, and having a melt index of about 0.7 was compounded with a weathering stabilizer system consisting of about 2.0 parts of an ultraviolet absorber, 1.5 parts of a polymeric hindered amine, and 0.1 parts of an antioxidant. The stabilizer system is not believed to affect the physical characteristics of the polymer, i.e., its adhesion or the strength of films formed therefrom. The stabilized copolymer was extruded from a 6.3 centimeter extruder through a 40.6 centimeter die onto a biaxially-oriented polyethylene terephthalate (PET) carrier web using a single flighted screw with a compression ratio of 3:1. The extruder temperatures for zones 1 through 5 were 190°, 60°, 273°, 264°, and 264° C., respectively, while the neck and die lips were maintained at 270° C. The extruder screw speed was 30 revolutions/minute, and the film takeaway speed was 27.4 meters/minute to provide a film caliper of about 50 microns. At these extruder conditions, the melt temperature of the stabilized copolymer was measured to be 282° C.

The extruded film was then hot laminated directly to the rear side of the specularly reflecting layer of a piece of an embedded-lens retroreflective sheeting comprising a monolayer of glass microspheres; a spacing layer made up of polyvinyl butyral, urea formaldehyde hardener, and polyester plasticizer; a vapor-coated aluminum specularly reflecting layer; and a saturated polyester melamine transparent cover film on a paper carrier with a glossy release coating. The lamination was performed at a speed of 9.1 meters/minute between a steel roller heated to 140° C. and a hard rubber nip roll under a pressure of 28,000 newtons/meter-width. The backing film was in contact with the steel roller and the base retroreflective sheeting was in contact with the rubber nip roll.

After the paper and PET carriers were removed, the rear, i.e., exposed, side of the backing film was surface treated with a corona discharge of 235 Watts/-meter$^2$/minute following which a layer of adhesive coated on a release liner was laminated thereto.

The resultant retroreflective sheeting was then wound upon itself into roll form for storage. The sheeting rolled well without buckling, crimping, or delaminating. This sheeting is referred to herein as Sheeting A.

The embossability, tensile strength, and elongation of Sheeting A were tested according to the methods described above and compared to a sample of Sheeting B, a retroreflective sheeting made in similar fashion but with no backing film.

Sheeting A was measured to have a tensile strength of 2,600 newtons/meter width and an elongation of 55 percent, and after being embossed was found, upon visual inspection with the unaided eye, to have suffered no cracking even at a embossing depth of 2.5 millimeters. Sheeting B was measured to have a tensile strength of 1,900 newtons/meter width and an elongation of 8 percent, and found to have suffered substantial cracking at an embossing depth of 1.5 millimeters, thus being considered unembossable.

EXAMPLE 2

A retroreflective sheeting was produced as described in Example 1, except no adhesive was applied to the rear side of the backing film. Instead, the sheeting was heat laminated directly to an aluminum plate blank. The lamination was performed under the lamination conditions described in Example 1 with the aluminum blank in contact with the heated steel roll.

The construction was embossed as in Example 1. Upon visual inspection, the sheeting was found to have suffered no cracking even at an embossing depth of 2.5 millimeters.

EXAMPLE 3

One hundred parts of PRIMACOR 3440, an extrusion grade, thermoplastic, HMW copolymer believed to consist of about 91 parts ethylene monomer and 9 parts acrylic acid monomer, and having a melt index of about 10 was compounded with a weathering stabilizer system consisting of about 2.0 parts of an ultraviolet absorber, 1.5 parts of a polymer hindred amine, and 0.1 parts of an antioxidant. The stabilizer system is not believed to affect the physical characteristics of the polymer, i.e., its adhesion or the strength of films formed therefrom. The stabilized copolymer was extruded under the same conditions as in Example 1 to produce a backing film.

The backing film was hot laminated to the rear side of the specularly reflecting layer of a piece of an embedded-lens, wide-angle flattop retroreflective sheeting comprising a vinyl cover film, a monolayer of glass microspheres, a spacing layer like that used in Example 1, and a vapor-coated aluminum specularly reflecting layer. The lamination was performed in the same manner and under the same conditions as described in Example 1. This sheeting is referred to herein as Sheeting C.

A layer of low molecular weight pressure-sensitive adhesive comprising an acrylic ester and a polar monomer was applied to the rear side of the backing film after corona treatment thereof. The adhesive, after conditioning as described below, has a release value of about 500 to 700 newtons/meter-width and is thus considered useful as a removable adhesive.

A control sample, referred to herein as Sheeting D, of the same sheeting was prepared wherein the backing film was omitted and the adhesive was coated directly upon the specularly reflective layer thereof.

Both samples were applied to clean, etched and degreased aluminum panels. The samples were then conditioned at room temperature for 24 hours, heated at 80° C. for 72 hours to achieve maximum tackification, and then cooled to room temperature.

When subjected to a 90° peel force, Sheeting C was easily removed from the aluminum panel, releasing therefrom in one piece, and removing substantially all of the adhesive with the sheeting. Sheeting D, however, when subjected to the 90° peel force, delaminated from the adhesive, removing substantially none of the adhesive.

EXAMPLE 4

Samples of Sheetings C and D from Example 3 were each applied to aluminum panels and conditioned as in Example 3, except an acrylic-based pressure-sensitive adhesive that, after the aforementioned conditioning, had a 90° peel adhesion release value of about 1400 newtons/meter-width was used.

When subjected to a 90° peel force, Sheeting C was removed from the aluminum panel cleanly in one piece, and the underlying adhesive substantially removed with it. Sheeting D, however, was extremely difficult to remove as it tended to shred and rip into small pieces.

EXAMPLE 5

A backing film comprising a 0.5 mil (12 micrometer) polyethylene self-adherent layer and 0.5 mil (12 micrometer) biaxially-oriented polyester terephthalate reinforcing layer was applied directly to the specularly reflecting layer of a retroreflective sheeting comprising a monolayer of glass microspheres embedded in a polyvinyl butyral spacing layer and a vapor-coated aluminum specularly reflecting layer on the rear side of the spacing layer.

The exposed surface of the self-adherent layer was treated with a corona discharge of 235 Watts/meter$^2$/minute and laminated to the rear side of the specularly reflecting layer under the same conditions as described in Example 1.

The composite had sufficient body, tensile strength, and tear resistance that it could be conveniently handled without crinkling, creasing, or tearing. A legend was then printed on the front side of the composite with a flexographic printing process. The sheeting was satisfactorily printed upon, the legend being substantially clear and undistorted, and the sheeting being handled upon the printing press essentially without damage. After the legend was printed, a layer of transparent transfer adhesive on a release liner was applied over the legend. This construction was then kiss-cut into individual validation stickers approximately 2 inches (5 centimeters) square.

The stickers were each applied to a sheet of clean glass by removing the release liner and laminating with hand pressure.

Various modifications and alterations of this invention will become apparent to those skilled in the art without departing from the scope and spirit of this invention.

What is claimed is:

1. A retroreflective sheeting comprising:
   (A) transparent microspheres, arranged in substantially a monolayer;
   (B) a transparent spacing layer which said microspheres are supported by and at least partially embedded in;

(C) a specularly reflecting layer underlying said spacing layer; and
(D) a backing film;
wherein said backing film comprises at least a self-adherent layer which is self-adhered directly to the rear side of said specularly reflecting layer, said self-adherent layer having been preformed prior to lamination to said specularly reflecting layer or having been extruded onto said specularly reflecting layer, said self-adherent layer being thermoplastic and having a melt index of less than about 500 and comprising:
polyethylene; or
one or more copolymers comprising by weight a major portion of at least one of ethylene or polyethylene, and a major portion of at least one of ethylene or propylene, and a minor portion of at least one polar comonomer; or
a blend comprising (a) one or more other polymers and (b) one or more of said copolymers or polyethylene or combinations of said copolymers or polyethylene, said blend comprising a major portion by weight of ethylene and/or propylene,
wherein the tensile strength of said retroreflective sheeting is substantially increased by said self-adherent layer.

2. The sheeting of claim 1 further comprising one or more cover films disposed in front of said microspheres.

3. The sheeting of claim 1 further comprising a layer of substantially transparent adhesive disposed in front of said microspheres.

4. The sheeting of claim 1 wherein said self-adherent layer comprises a copolymer of at least one of ethylene or propylene with at least one polar comonomer.

5. The sheeting of claim 4 wherein said polar comonomer comprises acrylic acid, methacrylic acid, ethyl acrylate, or vinyl acetate.

6. The sheeting of claim 1 wherein said self-adherent layer comprises a blend comprising (a) one or more other polymers and (b) one or more of said copolymers or polyethylene or combinations of said copolymers and polyethylene, said blend comprising a major portion by weight of ethylene and/or propylene.

7. The sheeting of claim 1 wherein said self-adherent layer comprises an ionomeric copolymer.

8. The sheeting of claim 7 wherein said self-adherent layer is crosslinked with zinc ions.

9. The sheeting of claim 1 wherein said backing film is less than about 125 micrometers thick.

10. The sheeting of claim 9 wherein said backing film is less than about 75 micrometers thick.

11. The sheeting of claim 1 wherein said backing film is preformed before being self-adhered directly to said specularly reflecting layer.

12. The sheeting of claim 1 wherein said backing film is extruded onto said specularly reflecting layer.

13. The sheeting of claim 1 wherein said backing film further comprises at least one of the following additives: a colorant, a filler, or a stabilizer.

14. The sheeting of claim 1 wherein said backing film is nonelastomeric.

15. The sheeting of claim 1 wherein said backing film further comprises at least one other layer on the rear side of said self-adherent layer.

16. The sheeting of claim 15 wherein said backing film further comprises a reinforcing layer on the rear side of said self-adherent layer.

17. The sheeting of claim 16 wherein said reinforcing layer comprises at least one of nylon, polyester, polypropylene, polycarbonate, acrylonitrile/butadiene/styrene, or glass-filled polymers.

18. The sheeting of claim 16 wherein self-adherent layer and said reinforcing layer have been coextruded on said specularly reflecting layer.

19. The sheeting of claim 16 further comprising an additional layer on the rear side of said reinforcing layer, said additional layer comprising: polyethylene; or one or more copolymers comprising by weight a major portion of at least one of ethylene and propylene, and a minor portion of a polar monomer; or a blend comprising (a) one or more other polymers and (b) one or more of said copolymers or polyethylene or combinations of said copolymers and polyethylene, said blend comprising a major portion by weight of ethylene and/or propylene.

20. The sheeting of claim 1 further comprising a layer of adhesive on the rear side of said backing film.

21. The sheeting of claim 20 wherein said rear side of said backing film was corona treated before application of said adhesive thereto.

22. The sheeting of claim 20 further comprising a release liner covering said layer of adhesive.

23. The sheeting of claim 20 wherein said adhesive is a transfer adhesive.

24. The sheeting of claim 20 wherein said adhesive is a removable adhesive.

25. The sheeting of claim 1 wherein said backing film provides a self-adhering bond to an article substantially without another adhesive agent.

26. An article comprising a substrate and the sheeting of claim 25 adhered directly thereto without another adhesive agent.

27. The sheeting of claim 1 wherein said spacing layer comprises a substantially thermoset material.

28. The sheeting of claim 27 wherein said self-adherent layer comprises a copolymer of at least one of ethylene or propylene with at least one polar comonomer.

29. The sheeting of claim 1 wherein said self-adherent layer comprises a major portion of ethylene monomer and up to 30 weight percent of acrylic acid, methacrylic acid, or vinyl acetate.

30. The sheeting of claim 1 wherein said self-adherent layer has a melt index of less than about 150.

31. The sheeting of claim 1 wherein said self-adherent layer has a melt index of less than about 20.

32. The sheeting of claim 1 wherein said specularly reflecting layer comprises aluminum and is about 100 nanometers thick.

33. The sheeting of claim 1 wherein said self-adherent layer was preformed and corona treated prior to lamination to said specularly reflecting layer.

* * * * *

UNITED STATES PATENT AND TRADEMARK OFFICE
CERTIFICATE OF CORRECTION

PATENT NO. : 4,983,436
DATED : January 8, 1991
INVENTOR(S) : Terry R. Bailey et al.

It is certified that error appears in the above-identified patent and that said Letters Patent is hereby corrected as shown below:

In Column 1, line 20, "Palmqulst" should read --Palmquist--.

In Column 4, line 47, delete the comma after the word "materials".

In Column 5, line 49, in the table headings, "Helt" should read --Melt--.

In Column 6, line 59, delete the comma after the word "possible".

In Column 10, line 42, "60°" should read --260°--.

In Column 11, lines 36-37, "extruslon" should read --extrusion--.

In Column 13, lines 13-15, delete "a major portion of at least one of ethylene or polyethylene, and".

Signed and Sealed this

Thirtieth Day of June, 1992

Attest:

DOUGLAS B. COMER

Attesting Officer

Acting Commissioner of Patents and Trademarks